United States Patent
Hamano et al.

(10) Patent No.: US 10,697,536 B2
(45) Date of Patent: Jun. 30, 2020

(54) TRANSMISSION CONTROL DEVICE AND TRANSMISSION CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Masahiro Hamano, Atsugi (JP); Youji Itou, Sagamihara (JP); Kosuke Abe, Isehara (JP); Haruka Ozono, Hadano (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 386 days.

(21) Appl. No.: 15/559,027

(22) PCT Filed: Feb. 17, 2016

(86) PCT No.: PCT/JP2016/054590
§ 371 (c)(1),
(2) Date: Sep. 15, 2017

(87) PCT Pub. No.: WO2016/152331
PCT Pub. Date: Sep. 29, 2016

(65) Prior Publication Data
US 2018/0080547 A1 Mar. 22, 2018

(30) Foreign Application Priority Data
Mar. 20, 2015 (JP) .................. 2015-057849

(51) Int. Cl.
*F16H 61/12* (2010.01)
*F16H 9/18* (2006.01)
(Continued)

(52) U.S. Cl.
CPC .............. *F16H 61/12* (2013.01); *F16H 9/18* (2013.01); *F16H 61/0021* (2013.01);
(Continued)

(58) Field of Classification Search
CPC ..... F16H 2061/1252; F16H 2061/1256; F16H 2061/126; F16H 2061/1264;
(Continued)

(56) References Cited

U.S. PATENT DOCUMENTS

2006/0063641 A1* 3/2006 Oshita .................... F16H 61/12
477/44
2008/0039279 A1* 2/2008 Soga ................. F16H 61/66259
477/45

(Continued)

FOREIGN PATENT DOCUMENTS

JP          H84863 A      1/1996

*Primary Examiner* — Jacob S. Scott
(74) *Attorney, Agent, or Firm* — Foley & Lardner LLP (57) ABSTRACT

In a transmission control device for controlling a transmission, a controller determines failure of a SOL corresponding to a hydraulic primary-pressure actuator. The controller variably controls line command pressure, and in a case where the failure is determined, continuously changes a speed ratio of a variator by variably controlling the line command pressure. The controller variably controls primary command pressure, and in a case where the failure is determined, fixes the primary command pressure to a primary pressure set value. The controller variably controls secondary command pressure, and in a case where the failure is determined, fixes the secondary command pressure to a secondary pressure set value.

6 Claims, 3 Drawing Sheets

(51) Int. Cl.
  *F16H 61/662* (2006.01)
  *F16H 61/00* (2006.01)
(52) U.S. Cl.
  CPC ..... *F16H 61/662* (2013.01); *F16H 61/66259* (2013.01); *F16H 2061/1264* (2013.01); *F16H 2061/1268* (2013.01); *F16H 2061/1288* (2013.01)
(58) Field of Classification Search
  CPC ..... F16H 2061/1268; F16H 2061/1288; F16H 2061/1292; F16H 61/0021; F16H 61/0025; F16H 61/0202; F16H 61/0251; F16H 2061/0034; F16H 2061/0037; F16H 61/662; F16H 61/66259; F16H 9/12; F16H 9/16; F16H 9/18; F16H 9/20
  See application file for complete search history.

(56) References Cited

U.S. PATENT DOCUMENTS

2010/0255942 A1* 10/2010 Ogata ..................... F16H 61/12
                                                          474/18
2018/0202541 A1*  7/2018 Tsuchida ................. F16H 61/12

\* cited by examiner

TRANSMISSION CONTROL DEVICE AND TRANSMISSION CONTROL METHOD

TECHNICAL FIELD

The present invention relates to a transmission control device for controlling a transmission and a transmission control method for controlling a transmission.

BACKGROUND ART

A technique of performing a fail-safe in a continuously variable transmission is disclosed in JP8-4863A. In this technique, in a case where a solenoid valve that controls primary pressure serving as control pressure of a primary pulley has a breakdown, line pressure is fixed as follows. That is, in this technique, in a case where vehicle speed has a predetermined value or less, the line pressure is fixed to the maximum pressure, and in a case where the vehicle speed is larger than the predetermined value, the line pressure is fixed to the minimum pressure. In this technique, the continuously variable transmission is shifted by a single pressure regulation method of fixing secondary pressure serving as control pressure of a secondary pulley to the line pressure.

SUMMARY OF INVENTION

As a shifting method of the continuously variable transmission, there is also a double pressure regulation method of not fixing one of the primary pressure and the secondary pressure to the line pressure but making both of these variables.

However, JP8-4863A does not disclose a fail-safe technique in a case where shift is performed by the double pressure regulation method. Regarding failure of a hydraulic primary-pressure actuator such as a solenoid valve that controls actual pressure of the primary pressure, failure modes vary and sometimes cannot easily be distinguished.

The present invention is achieved in consideration of such a technical problem, and an object thereof is to provide a transmission control device for controlling and a transmission control method for controlling a transmission capable of performing a fail-safe which is effective for the time of failure of a hydraulic primary-pressure actuator configured to control actual pressure of primary pressure in a case where shift is performed by the double pressure regulation method.

According to one aspect of the present invention, a transmission control device controls a transmission. The transmission includes: a variator having a primary pulley whose groove width is changed by controlling primary pressure, a secondary pulley whose groove width is changed by controlling secondary pressure, and a belt looped over the primary pulley and the secondary pulley; a hydraulic line-pressure actuator configured to control actual pressure of line pressure serving as source pressure of the primary pressure and the secondary pressure; a hydraulic primary-pressure actuator configured to control actual pressure of the primary pressure; and a hydraulic secondary-pressure actuator configured to control actual pressure of the secondary pressure. The transmission control device includes: a failure determination unit configured to determine failure of the hydraulic primary-pressure actuator; a line command pressure control unit configured to variably control line command pressure serving as command pressure to the hydraulic line-pressure actuator, and in a case where the failure is determined, to continuously change a speed ratio of the variator by variably controlling the line command pressure; a primary command pressure control unit configured to variably control primary command pressure serving as command pressure to the hydraulic primary-pressure actuator, and in a case where the failure is determined, to fix the primary command pressure to a primary pressure set value which is a first predetermined value or more; and a secondary command pressure control unit configured to variably control secondary command pressure serving as command pressure to the hydraulic secondary-pressure actuator, and in a case where the failure is determined, to fix the secondary command pressure to a secondary pressure set value which is a second predetermined value or more.

According to another aspect of the present invention, a control method controls a transmission. The transmission includes: a variator having a primary pulley whose groove width is changed by controlling primary pressure, a secondary pulley whose groove width is changed by controlling secondary pressure, and a belt looped over the primary pulley and the secondary pulley; a hydraulic line-pressure actuator configured to control actual pressure of line pressure serving as source pressure of the primary pressure and the secondary pressure; a hydraulic primary-pressure actuator configured to control actual pressure of the primary pressure; and a hydraulic secondary-pressure actuator configured to control actual pressure of the secondary pressure. The transmission control method includes: determining failure of the hydraulic primary-pressure actuator; variably controlling line command pressure serving as command pressure to the hydraulic line-pressure actuator, and in a case where the failure is determined, continuously changing a speed ratio of the variator by variably controlling the line command pressure; variably controlling primary command pressure serving as command pressure to the hydraulic primary-pressure actuator, and in a case where the failure is determined, fixing the primary command pressure to a primary pressure set value which is a set value of a first predetermined value or more; and variably controlling secondary command pressure serving as command pressure to the hydraulic secondary-pressure actuator, and in a case where the failure is determined, fixing the secondary command pressure to a secondary pressure set value which is a set value of a second predetermined value or more.

According to these aspects, in a case where the failure is determined, the primary command pressure is fixed to the first predetermined value or more irrespective of the failure mode. Thus, in a failure mode in which actual pressure is changed in accordance with command pressure, the actual pressure of the primary pressure can be increased. Since the secondary command pressure is fixed to the second predetermined value or more, the actual pressure of the secondary pressure can also be increased. As a result, in a case where shift is performed by the double pressure regulation method, and in a case where the failure mode is a failure mode in which actual pressure is changed in accordance with command pressure at the time of failure of the hydraulic primary-pressure actuator, a fail-safe that suppresses generation of belt slippage can be performed.

According to these aspects, in a case where the failure is determined, the speed ratio of the variator is continuously changed by variably controlling the line command pressure. Thus, by performing shift within a shiftable range, deterioration of a driving property of a vehicle on which the transmission is mounted can be suppressed as well.

MODE FOR CARRYING OUT INVENTION

Hereinafter, an embodiment of the present invention will be described with reference to the attached drawings. In this description, the expression "actual pressure" is mainly used for emphasizing that the pressure is actual pressure or for making a distinction from command pressure. Therefore, in this description, even when the pressure is actual pressure, the pressure is sometimes not specifically called "actual pressure".

Figure 1:
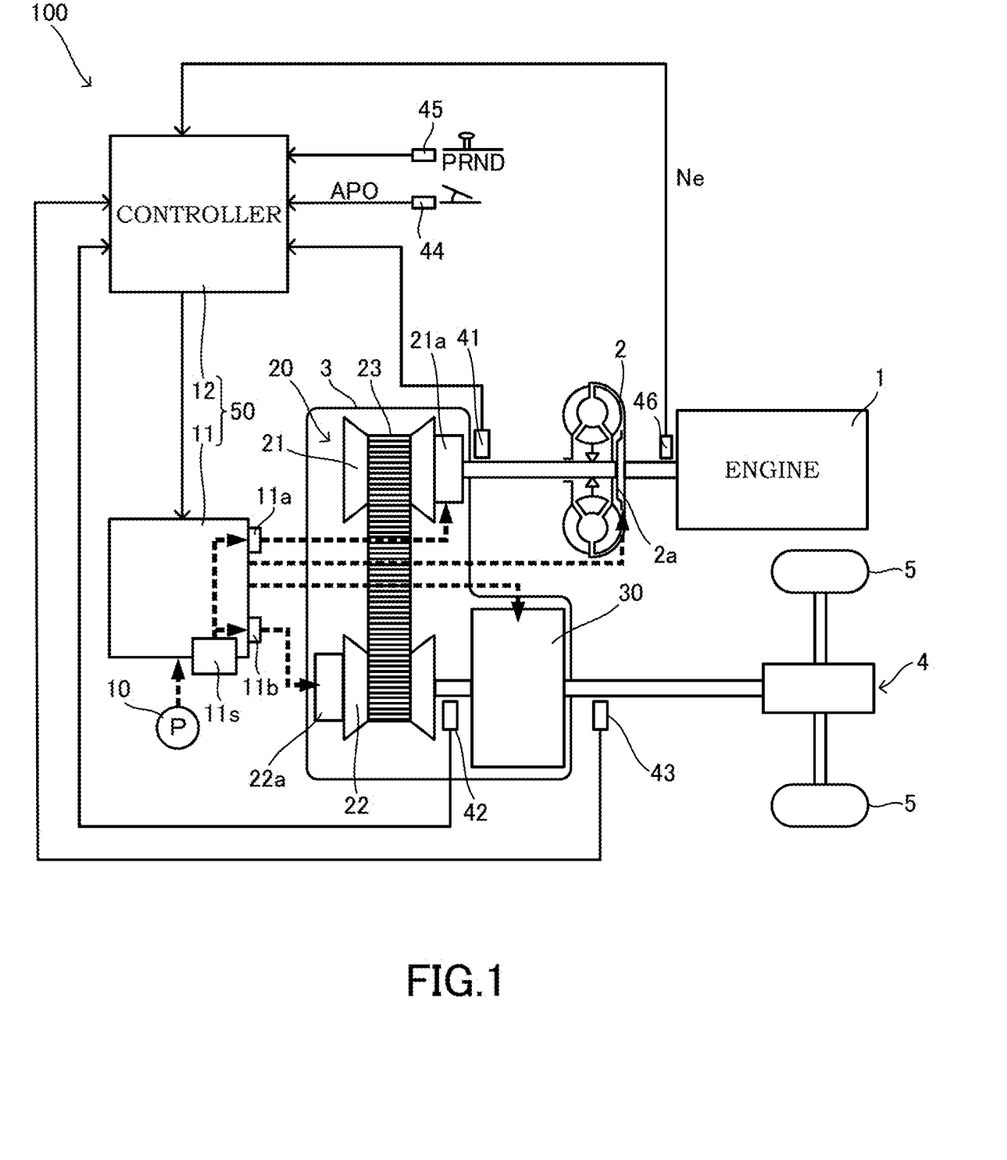
FIG. 1 is a diagram showing major portions of a vehicle including a transmission.

FIG. 1 is a diagram showing major portions of a vehicle including a transmission 100. The vehicle includes an engine 1, a torque converter 2, a variator 20, a sub-transmission mechanism 30, an axle 4, and drive wheels 5.

The engine 1 forms a power source of the vehicle. The torque converter 2 transmits power via a fluid. In the torque converter 2, by engaging a lock-up clutch 2a, power transmission efficiency can be enhanced. The variator 20 and the sub-transmission mechanism 30 output inputted rotation speed as rotation speed in accordance with a speed ratio. The speed ratio has a value obtained by dividing the inputted rotation speed by the outputted rotation speed. The axle 4 is a drive axle formed by a reduction gear and a differential device. The power of the engine 1 is transmitted to the drive wheels 5 via the torque converter 2, the variator 20, the sub-transmission mechanism 30, and the axle 4.

The variator 20 is a continuously variable transmission mechanism including a primary pulley 21, a secondary pulley 22, and a belt 23. Hereinafter, the primary pulley 21 will be also simply referred to as the pulley 21, and the secondary pulley 22 will be also simply referred to as the pulley 22.

The primary pulley 21 includes a fixed conical plate, a movable conical plate, and a hydraulic cylinder 21a. The secondary pulley 22 includes a fixed conical plate, a movable conical plate, and a hydraulic cylinder 22a. In each of the pulleys 21, 22, the fixed conical plate and the movable conical plate are arranged in a state where sheave surfaces face each other to form a V groove. In the pulley 21, the hydraulic cylinder 21a, or in the pulley 22, the hydraulic cylinder 22a is provided on a back surface of the movable conical plate to displace the movable conical plate in the axial direction. The belt 23 is looped over the pulley 21 and the pulley 22. A V belt can be used as the belt 23.

Primary pressure serving as control pressure of the primary pulley 21 acts on the hydraulic cylinder 21a. In the pulley 21, width of the V groove is changed by controlling the primary pressure. Secondary pressure serving as control pressure of the secondary pulley 22 acts on the hydraulic cylinder 22a. In the pulley 22, width of the V groove is changed by controlling the secondary pressure.

By adjusting the primary pressure and changing the width of the V groove of the pulley 21, a contact radius of the pulley 21 and the belt 23 is changed. By adjusting the secondary pressure and changing the width of the V groove of the pulley 22, a contact radius of the pulley 22 and the belt 23 is changed. Therefore, by controlling the width of the V grooves of the pulley 21 and the pulley 22, the speed ratio of the variator 20 can be steplessly controlled.

Since the variator 20 is formed in such a way, the variator is formed as a variator for the double pressure regulation method. The double pressure regulation method is a pressure regulation method in which a greater-than or less-than relationship is switched between the primary pressure and the secondary pressure. Therefore, in the double pressure regulation method, the greater-than or less-than relationship between the primary pressure and the secondary pressure includes a case of primary pressure>secondary pressure, a case of primary pressure=secondary pressure, and a case of primary pressure<secondary pressure. In the variator 20 for performing shift by the double pressure regulation method, setting is made in such a manner that a pressure receiving area of the primary pulley 21 and a pressure receiving area of the secondary pulley 22 are equal. A return spring for biasing the movable conical plate is provided in the secondary pulley 22.

The sub-transmission mechanism 30 is a multi-gear transmission mechanism having gear positions of two forward gear positions and one backward gear position. The sub-transmission mechanism 30 has a first speed gear position and a second speed gear position whose speed ratio is less than the first speed gear position as the forward gear positions. The sub-transmission mechanism 30 is provided on the output side of the variator 20 in series in a power transmission path running from the engine 1 to the drive wheels 5. The sub-transmission mechanism 30 may be directly connected to the variator 20 or may be indirectly connected to the variator 20 via other configurations such as a gear train.

In the vehicle, the speed ratio is changed in each of the variator 20 and the sub-transmission mechanism 30. Therefore, in the vehicle, shift is performed in accordance with a through speed ratio which is a speed ratio of the entirety of the variator 20 and the sub-transmission mechanism 30 obtained by multiplying the speed ratio of the variator 20 by the speed ratio of the sub-transmission mechanism 30.

The variator 20 forms an automatic transmission mechanism 3 together with the sub-transmission mechanism 30. The variator 20 and the sub-transmission mechanism 30 may be formed as structurally individual transmission mechanisms.

The vehicle further includes an oil pump 10, a hydraulic control circuit 11, and a controller 12.

The oil pump 10 generates hydraulic pressure. A mechanical oil pump to be driven by the power of the engine 1 can be used as the oil pump 10.

The hydraulic control circuit 11 adjusts the hydraulic pressure generated by oil supply of the oil pump 10 and transmits to portions of the variator 20 and the sub-transmission mechanism 30. The hydraulic control circuit 11 includes a line pressure solenoid valve 11s, a primary pressure solenoid valve 11a, and a secondary pressure solenoid valve 11b. Hereinafter, the line pressure solenoid valve 11s will be referred to as the SOL 11s. The primary pressure solenoid valve 11a will be referred to as the SOL 11a, and the secondary pressure solenoid valve 11b will be referred to as the SOL 11b.

The SOL 11s is one example of a hydraulic line-pressure actuator for controlling actual pressure of line pressure. Specifically, the SOL 11s controls the actual pressure of the line pressure in accordance with line command pressure serving as command pressure to the SOL 11s. The line pressure is hydraulic pressure serving as source pressure of the primary pressure and the secondary pressure, the pressure being set in such a manner that slippage of the belt 23 is not generated.

The SOL 11a is one example of a hydraulic primary-pressure actuator for controlling actual pressure of the primary pressure. Specifically, the SOL 11a controls the actual pressure of the primary pressure in accordance with primary command pressure serving as command pressure to the SOL 11a.

The SOL 11b is one example of a hydraulic secondary-pressure actuator for controlling actual pressure of the secondary pressure. Specifically, the SOL 11b controls the actual pressure of the secondary pressure in accordance with secondary command pressure serving as command pressure to the SOL 11b.

Specifically, the following solenoid valve is used as the SOL 11s, the SOL 11a, and the SOL 11b. That is, a solenoid valve, in which the solenoid portion uses a linear solenoid actuator for performing linear driving in accordance with the magnitude of an energized electric current, is used. Furthermore, a solenoid valve, in which the valve portion uses a valve mechanism for performing pressure regulation by changing the degree of drainage in accordance with the drive of the solenoid portion, is used. In such a solenoid valve, a drainage port is fully closed in a case where the command pressure has the maximum value. A normal-high solenoid valve in which a command of energization stop is a command of command pressure of the maximum value is used as the SOL 11s, the SOL 11a, and the SOL 11b.

In the present embodiment, the SOL 11s is further combined with a line pressure control valve for adjusting the hydraulic pressure generated by the oil pump 10 to generate the line pressure. The SOL 11a is further combined with a primary pressure control valve for generating the primary pressure from the line pressure, and the SOL 11b is further combined with a secondary pressure control valve generating the secondary pressure from the line pressure.

The SOL 11s of such a configuration controls the actual pressure of the line pressure by generating control pressure of the line pressure control valve, in other words, pilot pressure in accordance with the line command pressure, and controlling the line pressure control valve by the generated control pressure. That is, in the present embodiment, the SOL 11s has a linear solenoid valve for generating the pilot pressure as the above solenoid valve, and has the line pressure control valve to be driven by the pilot pressure generated by the linear solenoid valve to generate the line pressure. The same is applied to the SOL 11a and the SOL 11b.

The controller 12 controls the hydraulic control circuit 11. Output signals of a rotation sensor 41, a rotation sensor 42, and a rotation sensor 43 are inputted to the controller 12. The rotation sensor 41 is a sensor corresponding to a variator input side rotation sensor for detecting rotation speed on the input side of the variator 20. The rotation sensor 42 is a sensor corresponding to a variator output side rotation sensor for detecting rotation speed on the output side of the variator 20. Specifically, the rotation sensor 42 detects the rotation speed on the output side of the variator 20 and on the input side of the sub-transmission mechanism 30. The rotation sensor 43 is a sensor corresponding to a sub-transmission mechanism output side rotation sensor for detecting rotation speed on the output side of the sub-transmission mechanism 30.

Specifically, the rotation speed on the input side of the variator 20 is rotation speed of an input shaft of the variator 20. The rotation speed on the input side of the variator 20 may be rotation speed at a position of the above power transmission path to sandwich, for example, a gear train with the variator 20. The same is applied to the rotation speed on the output side of the variator 20 and the rotation speed on the output side of the sub-transmission mechanism 30.

In addition, output signals of an accelerator position sensor 44, an inhibitor switch 45, an engine rotation sensor 46, and the like are inputted to the controller 12. The accelerator position sensor 44 detects an accelerator position APO which represents an operation amount of an accelerator pedal. The inhibitor switch 45 detects a position of a selector lever. The engine rotation sensor 46 detects rotation speed Ne of the engine 1. The controller 12 can detect vehicle speed VSP on the basis of the output signal of the rotation sensor 43.

The controller 12 generates a shift control signal on the basis of these signals. The shift control signal includes signals for giving a command for the line command pressure, the primary command pressure, and the secondary command pressure. Therefore, the controller 12 variably controls the line command pressure, the primary command pressure, and the secondary command pressure by generating the shift control signal on the basis of various signals described above. The controller 12 outputs the generated shift control signal to the hydraulic control circuit 11.

The hydraulic control circuit 11 controls the actual pressure of the line pressure, the primary pressure, and the secondary pressure on the basis of the shift control signal from the controller 12, and in addition, performs switching of a hydraulic path or the like. Specifically, the hydraulic control circuit 11 controls the actual pressure for each of the line pressure, the primary pressure, and the secondary pressure in such a manner that the actual pressure becomes the command pressure.

Thereby, the hydraulic pressure is transmitted from the hydraulic control circuit 11 to the portions of the variator 20 and the sub-transmission mechanism 30 in accordance with the shift control signal. As a result, the speed ratio of the variator 20 and the sub-transmission mechanism 30 is changed to be a speed ratio in accordance with the shift control signal, that is, a target speed ratio.

The target speed ratio can be set in accordance with the accelerator position APO and the vehicle speed VSP. The target speed ratio may be set in accordance with a throttle position TVO of a throttle valve for adjusting an intake air amount of the engine 1 instead of the accelerator position APO. The line command pressure, the primary command pressure, and the secondary command pressure can be set in accordance with the target speed ratio.

The transmission 100 is an automatic transmission having, in addition to the hydraulic control circuit 11 and the controller 12 for controlling the speed ratio in such a way, the variator 20, the sub-transmission mechanism 30, the rotation sensor 41, the rotation sensor 42, and the rotation sensor 43. The accelerator position sensor 44, the inhibitor switch 45, and the engine rotation sensor 46 may be grasped as a configuration of the transmission 100.

The hydraulic control circuit 11 and the controller 12 form a control device 50 for a transmission for performing control in the transmission 100. Hereinafter, the control device 50 for the transmission will be simply referred to as the control device 50.

Figure 2:
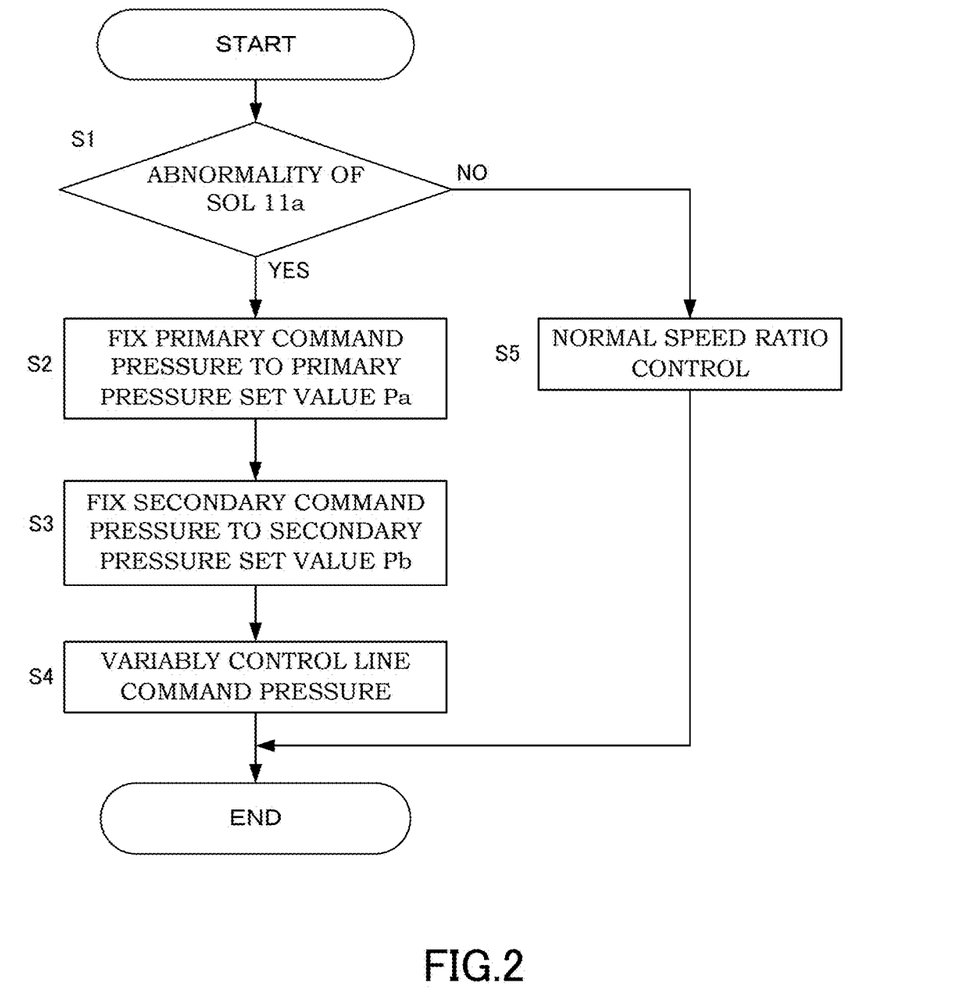
FIG. 2 is a flowchart showing one example of control performed by a controller.

FIG. 2 is a flowchart showing one example of the control performed by the controller 12. The controller 12 can repeatedly execute the process shown in this flowchart for every extremely-short time. The controller 12 determines whether or not the SOL 11a is abnormal in Step S1.

Failure modes of the SOL 11a include, for example, a power supply fault, an earth fault, disconnection, lowering, and heightening. The power supply fault is failure in which a short circuit occurs with the power supply. The earth fault is failure in which a short circuit occurs with the ground.

When the power supply fault occurs, the SOL 11*a* is maintained in an energized state. When the earth fault occurs, the SOL 11*a* is maintained in a non-energized state. The same is applied to a case of the disconnection. The lowering is failure in which actual pressure is lower than command pressure. The heightening is failure in which actual pressure is higher than command pressure.

There is a case in which these failure modes cannot be easily distinguished. For example, a situation where the command pressure has the lowest value and the actual pressure also has the lowest value at the time of failure can be caused both by the power supply fault and by the lowering. In this case, in order to distinguish whether the failure mode is the power supply fault or the lowering, for example, the command pressure has to be changed to confirm whether or not the actual pressure is changed.

Therefore, in Step S1, the controller 12 determines whether or not the SOL 11*a* is abnormal by determining whether or not an abnormal state including at least any of these failure modes as the failure mode is generated. A determination of whether or not the SOL 11*a* is abnormal may include plural determinations. The known technique and other appropriate techniques may be applied to the determination of whether or not the SOL 11*a* is abnormal.

When a negative determination is provided in Step S1, the process is forwarded to Step S5. In this case, the controller 12 performs normal speed ratio control. In Step S5, the controller 12 controls the speed ratio of the variator 20 by variably controlling the line command pressure, the primary command pressure, and the secondary command pressure.

In Step S5, the line command pressure is controlled in accordance with input torque to the transmission 100 in such a manner that slippage of the belt 23 is not generated. The primary command pressure and the secondary command pressure are controlled in accordance with the target speed ratio in such a manner that the speed ratio of the variator 20 becomes the target speed ratio.

In Step S5, the primary command pressure and the secondary command pressure are further controlled in accordance with the input torque to the transmission 100. With such a control, the primary command pressure and the secondary command pressure are controlled correspondingly to the line command pressure, in which slippage of the belt 23 is not generated. Accordingly, with such control, slippage of the belt 23 is not generated. After Step S5, the process of this flowchart is once ended.

When a positive determination is provided in Step S1, the process is forwarded to Step S2. In this case, the controller 12 fixes the primary command pressure to a primary pressure set value Pa. The primary pressure set value Pa is a first predetermined value or more, and in the present embodiment, the maximum value of the primary command pressure. The first predetermined value may be a value with which slippage of the belt 23 can be suppressed.

Specifically, in Step S2, the controller 12 controls the primary command pressure in such a manner that the primary command pressure takes a first predetermined time to have the primary pressure set value Pa. The first predetermined time can be a time generated by making an inclination in a graph showing a change in the primary command pressure in accordance with time in a case where the primary command pressure does not have the primary pressure set value Pa. The first predetermined time may be a time determined in accordance with such an inclination or the primary command pressure at the time of starting the control of this step. In a case where the primary command pressure originally has the primary pressure set value Pa, the first predetermined time may be zero.

In Step S3, the controller 12 fixes the secondary command pressure to a secondary pressure set value Pb. The secondary pressure set value Pb is a second predetermined value or more, and in the present embodiment, the maximum value of the secondary command pressure. The second predetermined value may be a value with which slippage of the belt 23 can be suppressed. The second predetermined value may be the same as the first predetermined value.

Specifically, in Step S3, the controller 12 controls the secondary command pressure in such a manner that the secondary command pressure takes a second predetermined time to have the secondary pressure set value Pb. The second predetermined time of this case is similar to the first predetermined time at the time of controlling the primary command pressure. The controller 12 starts a change in the secondary command pressure after start of a change in the primary command pressure by performing the process of Step S2 and successively performing the process of Step S3.

In Step S4, the controller 12 continuously changes the speed ratio of the variator 20 by variably controlling the line command pressure. Specifically, the controller 12 continuously changes the speed ratio of the variator 20 by controlling the line command pressure in accordance with the vehicle speed VSP. In Step S4, the controller 12 controls the line command pressure by open-loop control. In Step S4, the controller 12 can variably control the line command pressure in a mode not in accordance with the input torque to the transmission 100. After Step S4, the process of this flowchart is once ended.

Regarding Step S2, fixing the primary command pressure to the primary pressure set value Pa means that the primary command pressure is maintained to have the primary pressure set value Pa until the failure is removed by repair or the like. The same is applied to Step S3.

Figure 3:
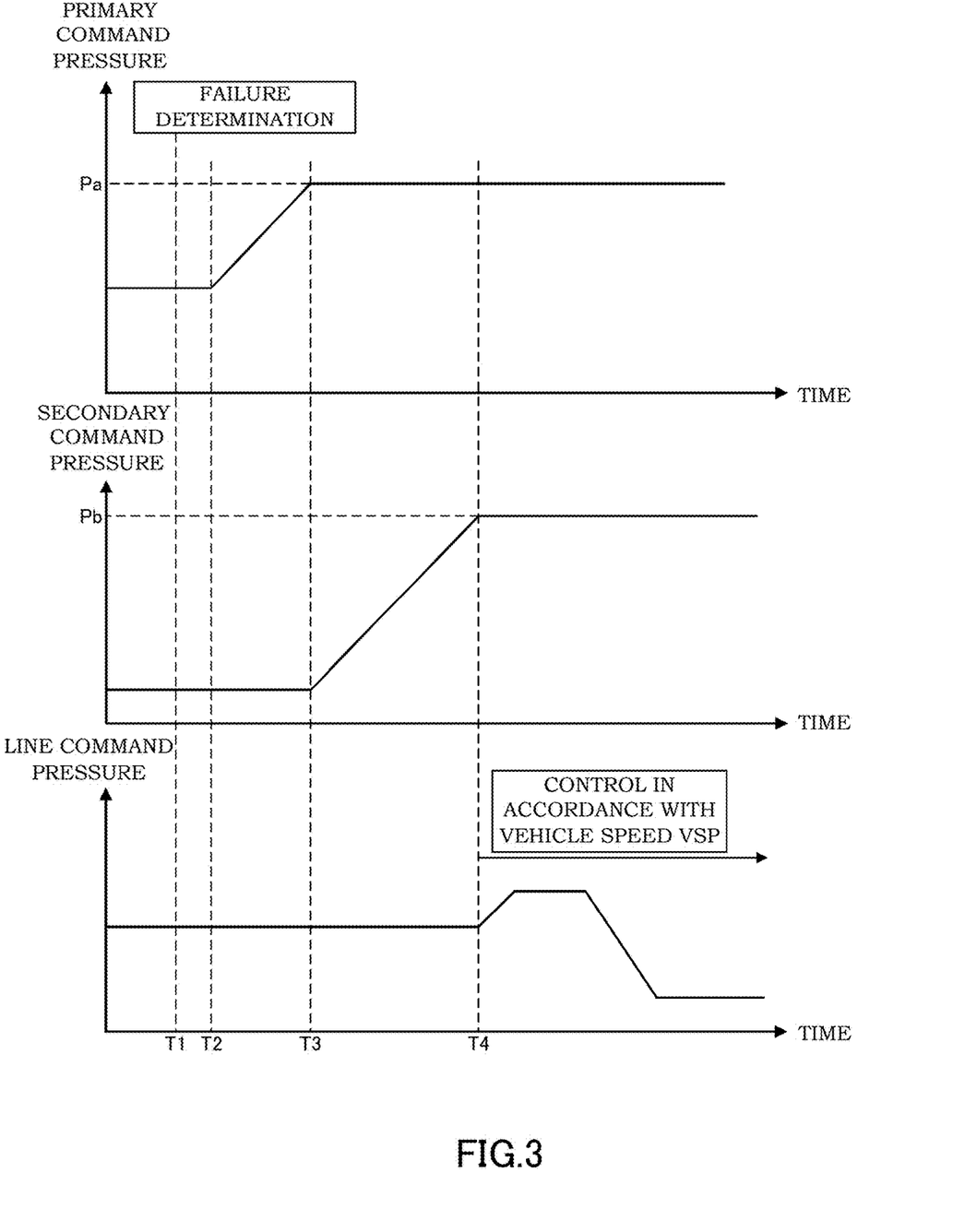
FIG. 3 is a diagram showing one example of a timing chart corresponding to the flowchart of FIG. 2.

FIG. 3 is a diagram showing one example of a timing chart corresponding to the flowchart of FIG. 2. FIG. 3 shows the primary command pressure, the secondary command pressure, and the line command pressure as parameters. FIG. 3 shows a case where the SOL 11*a* fails in the failure mode in which the actual pressure is changed in accordance with the command pressure such as the lowering and the heightening.

At a timing T1, the failure of the SOL 11*a* is determined. Therefore, the primary command pressure is controlled to take the first predetermined time to have the primary pressure set value Pa from a timing T2 which is the timing T1 or later. At this time, the primary command pressure is controlled to be gradually increased. The primary command pressure has the primary pressure set value Pa at a timing T3 which is a timing after the timing T2. The primary command pressure is fixed to the primary pressure set value Pa at the timing T3 or later.

From the timing T3 forward, the secondary command pressure is controlled to take the second predetermined time to have the secondary pressure set value Pb. At this time, the secondary command pressure is controlled to be gradually increased. As shown in this example, the change in the secondary command pressure can be started, for example, after the primary command pressure is fixed to the primary pressure set value Pa. The change in the secondary command pressure may be started before the primary command pressure is fixed to the primary pressure set value Pa. The secondary command pressure has the secondary pressure set value Pb at a timing T4 which is a timing after the timing T3.

The secondary command pressure is fixed to the secondary pressure set value Pb at the timing T4 or later.

From the timing T4 forward, the line command pressure is controlled in accordance with the vehicle speed VSP. As shown in this example, control of the line command pressure can be started after the primary command pressure is fixed to the primary pressure set value Pa and the secondary command pressure is fixed to the secondary pressure set value Pb.

In the present embodiment, a failure determination unit is realized by the controller 12, specifically by part of the controller 12 functionally grasped as a portion that performs the determination of Step S1 described above. A line command pressure control unit is realized by the controller 12, specifically by part of the controller 12 functionally grasped as a portion that performs the process of Step S4 and Step S5 described above. A primary command pressure control unit is realized by the controller 12, specifically by part of the controller 12 functionally grasped as a portion that performs the process of Step S2 and Step S5 described above. A secondary command pressure control unit is realized by the controller 12, specifically by part of the controller 12 functionally grasped as a portion that performs the process of Step S3 and Step S5 described above.

Next, major operations and effects of the control device 50 will be described.

In a case where the SOL 11a fails in the failure mode in which the actual pressure is not changed in accordance with the command pressure such as the power supply fault, the earth fault, and the disconnection, even by fixing the primary command pressure to the primary pressure set value Pa, the actual pressure of the primary pressure is not changed. Meanwhile, in a case where the SOL 11a fails in the failure mode in which the actual pressure is changed in accordance with the command pressure such as the lowering and the heightening, by fixing the primary command pressure to the primary pressure set value Pa, the actual pressure of the primary pressure can be increased. However, these failure modes can sometimes be not easily distinguished as described above.

In consideration of such a circumstance, the control device 50 performs control in the transmission 100 having the variator 20, the SOL 11s, the SOL 11a, and the SOL 11b. The control device 50 has the controller 12. The controller 12 determines the failure of the SOL 11a. The controller 12 variably controls the line command pressure, and in a case where the failure is determined, continuously changes the speed ratio of the variator 20 by variably controlling the line command pressure. The controller 12 variably controls the primary command pressure, and in a case where the failure is determined, fixes the primary command pressure to the primary pressure set value Pa. The controller 12 variably controls the secondary command pressure, and in a case where the failure is determined, fixes the secondary command pressure to the secondary pressure set value Pb.

With the control device 50 of such a configuration, in a case where the failure is determined, the primary command pressure is fixed to the primary pressure set value Pa irrespective of the failure mode. Thus, in the failure mode in which the actual pressure is changed in accordance with the command pressure, the actual pressure of the primary pressure can be increased. Since the secondary command pressure is fixed to the secondary pressure set value Pb, the actual pressure of the secondary pressure can also be increased. As a result, in a case where shift is performed by the double pressure regulation method, and in a case where the failure mode is the failure mode in which the actual pressure is changed in accordance with the command pressure at the time of the failure of the SOL 11a, a fail-safe that suppresses generation of slippage of the belt 23 can be performed.

With the control device 50 of such a configuration, in a case where the failure is determined, the speed ratio of the variator 20 is continuously changed by controlling the line command pressure. Thus, by performing shift within a shiftable range, deterioration of a driving property of the vehicle on which the transmission 100 is mounted can be suppressed as well.

In the control device 50, in a case where the failure is determined, the controller 12 controls the primary command pressure in such a manner that the primary command pressure takes the first predetermined time to have the primary pressure set value Pa.

With the control device 50 of such a configuration, irrespective of the failure mode in which the actual pressure is not changed in accordance with the command pressure or the failure mode in which the actual pressure is changed in accordance with the command pressure, the fail-safe can be executed. Therefore, before identification of the type of the failure mode is completed, the fail-safe can be executed. In a case of the failure mode in which the actual pressure is changed in accordance with the command pressure, a radical change in the actual pressure of the primary pressure can be prevented.

In the control device 50, in a case where the failure is determined, the controller 12 controls the secondary command pressure in such a manner that the secondary command pressure takes the second predetermined time to have the secondary pressure set value Pb.

With the control device 50 of such a configuration, a radical change in the actual pressure of the secondary pressure can be prevented. As a result, uncomfortable feeling a driver of the vehicle on which the transmission 100 is mounted has due to a radical change in the speed ratio of the variator 20 can be prevented.

When the SOL 11a and the SOL 11b are controlled at the same time upon fixing the command pressure to the set value, there is a possibility that an oil amount generating the line pressure serving as the source pressure becomes insufficient for the entire oil amount required from the SOL 11a side and the SOL 11b side. In a case where the failure mode is the lowering, the actual pressure of the primary pressure is lowered with respect to the primary command pressure. Thus, slippage of the belt 23 is easily generated.

In consideration of such a circumstance, in the control device 50, in a case where the failure is determined, the controller 12 starts the change in the secondary command pressure after start of the change in the primary command pressure.

With the control device 50 of such a configuration, a timing of starting the change to the set value is differentiated between the primary command pressure and the secondary command pressure. Thus, a situation where the SOL 11a and the SOL 11b scramble for the line pressure and shortage in the supplied oil amount is generated can be suppressed. The change in the command pressure is started giving priority to the SOL 11a in which the failure is generated. Thus, even in a case where the failure mode is the lowering, generation of slippage of the belt 23 can be effectively suppressed. As a result, the fail-safe can be performed giving the highest priority to prevention of slippage of the belt 23.

The embodiment of the present invention is described above. However, the above embodiment does not intend to limit the technical scope of the present invention to the specific configurations of the above embodiment but only indicates part of application examples of the present invention.

This application claims priority based on Japanese Patent Application No. 2015-57849 filed with the Japan Patent Office on Mar. 20, 2015, the entire contents of which are incorporated into this specification.

The invention claimed is:

1. A transmission control device for controlling a transmission, the transmission having:
   a variator having a primary pulley whose groove width is changed by controlling a primary pressure serving as a control pressure of the primary pulley, a secondary pulley whose groove width is changed by controlling a secondary pressure serving as a control pressure of the secondary pulley, and a belt looped over the primary pulley and the secondary pulley;
   a hydraulic line-pressure actuator configured to control actual pressure of a line pressure serving as a source pressure of the primary pressure and the secondary pressure;
   a hydraulic primary-pressure actuator configured to control actual pressure of the primary pressure; and
   a hydraulic secondary-pressure actuator configured to control actual pressure of the secondary pressure, wherein
   the transmission control device is configured to determine failure of the hydraulic primary-pressure actuator;
   the transmission control device is configured to variably control a line command pressure serving as command pressure to the hydraulic line-pressure actuator, and in a case where the failure is determined, to continuously change a speed ratio of the variator by variably controlling the line command pressure;
   the transmission control device is configured to variably control a primary command pressure serving as command pressure to the hydraulic primary-pressure actuator, and in a case where the failure is determined, to fix the primary command pressure to a primary pressure set value which is a first predetermined value or more; and
   the transmission control device is configured to variably control a secondary command pressure serving as command pressure to the hydraulic secondary-pressure actuator, and in a case where the failure is determined, to fix the secondary command pressure to a secondary pressure set value which is a second predetermined value or more.

2. The transmission control device according to claim 1, wherein
   the transmission control device is configured to, in a case where the failure is determined, control the primary command pressure in such a manner that the primary command pressure takes a first predetermined time to have the primary pressure set value.

3. The transmission control device according to claim 1, wherein
   the transmission control device is configured to, in a case where the failure is determined, control the secondary command pressure in such a manner that the secondary command pressure takes a second predetermined time to have the secondary pressure set value.

4. The transmission control device according to claim 1, wherein
   the transmission control device is configured to, in a case where the failure is determined, start a change in the secondary command pressure after a start of a change in the primary command pressure.

5. A transmission control method for controlling a transmission, the transmission having:
   a variator having a primary pulley whose groove width is changed by controlling a primary pressure serving as a control pressure of the primary pulley, a secondary pulley whose groove width is changed by controlling a secondary pressure serving as a control pressure of the secondary pulley, and a belt looped over the primary pulley and the secondary pulley;
   a hydraulic line-pressure actuator configured to control actual pressure of a line pressure serving as a source pressure of the primary pressure and the secondary pressure;
   a hydraulic primary-pressure actuator configured to control actual pressure of the primary pressure; and
   a hydraulic secondary-pressure actuator configured to control actual pressure of the secondary pressure,
   the transmission control method comprising:
   determining failure of the hydraulic primary-pressure actuator;
   variably controlling a line command pressure serving as command pressure to the hydraulic line-pressure actuator, and in a case where the failure is determined, continuously changing a speed ratio of the variator by variably controlling the line command pressure;
   variably controlling a primary command pressure serving as command pressure to the hydraulic primary-pressure actuator, and in a case where the failure is determined, fixing the primary command pressure to a primary pressure set value which is a set value of a first predetermined value or more; and
   variably controlling a secondary command pressure serving as command pressure to the hydraulic secondary-pressure actuator, and in a case where the failure is determined, fixing the secondary command pressure to a secondary pressure set value which is a set value of a second predetermined value or more.

6. A transmission control device for controlling a transmission, the transmission having:
   a variator having a primary pulley whose groove width is changed by controlling a primary pressure serving as a control pressure of the primary pulley, a secondary pulley whose groove width is changed by controlling a secondary pressure serving as a control pressure of the secondary pulley, and a belt looped over the primary pulley and the secondary pulley;
   a hydraulic line-pressure actuator configured to control actual pressure of a line pressure serving as a source pressure of the primary pressure and the secondary pressure;
   a hydraulic primary-pressure actuator configured to control actual pressure of the primary pressure; and
   a hydraulic secondary-pressure actuator configured to control actual pressure of the secondary pressure,
   the transmission control device comprising:
   failure determination means for determining failure of the hydraulic primary-pressure actuator;
   line command pressure control means for variably controlling a line command pressure serving as command pressure to the hydraulic line-pressure actuator, and in a case where the failure is determined, to continuously change a speed ratio of the variator by variably controlling the line command pressure;

primary command pressure control means for variably controlling a primary command pressure serving as command pressure to the hydraulic primary-pressure actuator, and in a case where the failure is determined, to fix the primary command pressure to a primary pressure set value which is a first predetermined value or more; and secondary command pressure control means for variably controlling a secondary command pressure serving as command pressure to the hydraulic secondary-pressure actuator, and in a case where the failure is determined, to fix the secondary command pressure to a secondary pressure set value which is a second predetermined value or more.

* * * * *